United States Patent

Niederman

[11] Patent Number: 5,520,408
[45] Date of Patent: May 28, 1996

[54] AIR BAG FOLD AND METHOD

[75] Inventor: Robert R. Niederman, Dayton, Ohio

[73] Assignee: General Motors Corporation, Detroit, Mich.

[21] Appl. No.: 384,261

[22] Filed: Feb. 6, 1995

[51] Int. Cl.[6] .................................................. B60R 21/16
[52] U.S. Cl. ..................... 280/728.1; 280/743.1
[58] Field of Search ........................... 280/743.1, 728.1, 280/731, 728.2, 730.1, 732, 728.3

[56] References Cited

U.S. PATENT DOCUMENTS

| | | | |
|---|---|---|---|
| 4,004,828 | 1/1977 | Sogabe et al. | 280/743.1 |
| 4,235,453 | 11/1980 | Lawson et al. | 280/743.1 |
| 4,300,894 | 11/1981 | Cumming et al. | 493/210 |
| 5,425,552 | 6/1995 | Linder | 280/743.1 |

FOREIGN PATENT DOCUMENTS

| | | | |
|---|---|---|---|
| 2-279441 | 11/1990 | Japan | 280/743.1 |
| 3-167048 | 7/1991 | Japan | 280/743.1 |

*Primary Examiner*—Anne Marie Boehler
*Assistant Examiner*—Peter C. English
*Attorney, Agent, or Firm*—Charles E. Leahy; Kathryn A. Marra

[57] ABSTRACT

A supplemental restraint system including an air bag for use in a vehicle to restrain an occupant during a sudden deceleration or collision. The air bag is folded in a triangular configuration and mounted on a generally quadrangular base unit such that the shape of the air bag, as folded, generally complements the quadrangular shape of the base unit.

10 Claims, 8 Drawing Sheets

AIR BAG FOLD AND METHOD

BACKGROUND OF THE INVENTION

1. Field of the Invention

The present invention relates generally to vehicle supplemental inflatable restraint systems and, more particularly, to an air bag having an improved fold configuration.

2. Description of the Prior Art

Driver side or passenger side supplemental inflatable restraint ("SIR") systems are employed in vehicles to augment protection traditionally afforded vehicle occupants through the use of seat belts. SIR systems typically include an air bag which may be stored in a module assembly located within the interior of the vehicle in close proximity to either a driver or one or more passengers. During deployment, gas is emitted rapidly from an inflator into the air bag to expand it to a fully inflated state.

Air bags are traditionally folded in a rectangular shape. However, recent module assembly designs have shifted away from using rectangular shapes in an effort to provide air bag covers having more aesthetically pleasing non-rectangular shapes.

A problem exists with the aforementioned design choices in that the rectangularly folded air bag does not complement the shape defined by the non-rectangular module assembly. This results in much wasted space within the module assembly. Such unused space is contrary to the desire to increase design efficiency and decrease air bag and module assembly material costs in the highly competitive automotive market.

What is needed, therefore, is an air bag fold and method of folding which facilitates increasing design efficiency by permitting the use of non-rectangular module assemblies.

SUMMARY OF THE INVENTION

Thus, it is a primary object of this invention to provide an improved supplemental inflatable restraint system having an air bag fold configuration that facilitates reducing the size and weight of the module assembly in which the bag is stored.

It is a further object of the present invention to provide an improved driver side supplemental inflatable restraint system having a folded air bag that generally complements the shape of the module assembly in which the air bag is stored to reduce the amount of unused space within the module assembly.

It is a further object of the present invention to provide an improved method of folding an air bag so that the air bag, when folded, generally complements the shape of the module assembly to increase the design efficiency of a driver side supplemental inflatable restraint system of the present invention.

In one aspect of the invention, a supplemental inflatable restraint system comprises a base, an air bag mounted to the base, and an inflator in fluid communication with the air bag for inflating the air bag, wherein the air bag has a triangular fold configuration which generally compliments the shape of the base. Preferably, the base has a quadrangular shape including a single axis of symmetry across a diagonal of the quadrangular shape. In addition, the air bag further includes a pleat fold stack being a plurality of laterally extending folds. The pleat fold stack has opposing first and second pleat stack arms extending laterally from opposite sides of the axis of symmetry. Each of the pleat stack arms includes a series of triangular folds to provide the air bag in a quadrangular shape that complements the quadrangular shape of the base. Preferably, the pleat stack arms each include a series of continuous triangular folds such that the air bag includes equivalent triangular fold stacks on opposing sides of the axis of symmetry which, together, complement the quadrangular shape of the base.

These and other objects and advantages of the invention will be apparent from the following description, the accompanying drawings, and the appended claims.

DETAILED DESCRIPTION OF THE PREFERRED EMBODIMENT

The supplemental inflatable restraint system of the present invention is particularly intended to be mounted within a vehicle steering wheel assembly for restraining a driver during sudden deceleration of the vehicle, such as during a collision.

Figure 1A:
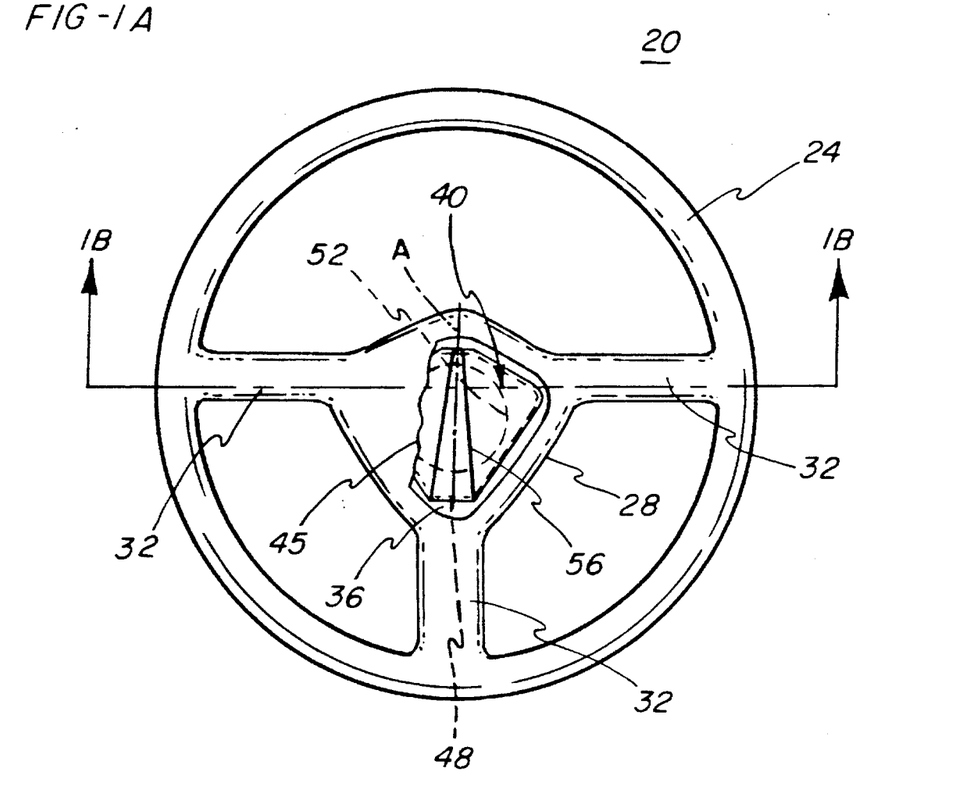
FIG. 1A is a partially cut away top plan view of a steering wheel assembly which employs a supplemental inflatable restraint system of the present invention.
Figure 1B:
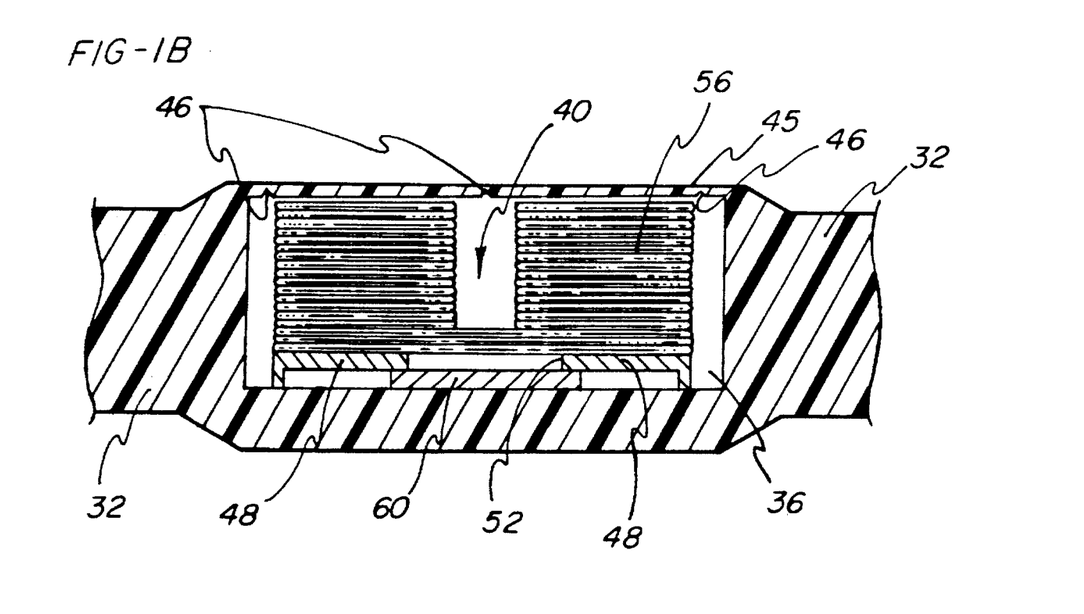
FIG. 1B is an enlarged cross-sectional view taken along line 1B—1B in FIG. 1A after a folded air bag has been mounted to the steering wheel assembly.

Referring initially to FIGS. 1A and 1B, there is shown a steering wheel assembly 20 having a circular handle portion 24 connected to a centrally located hub portion 28 via three connecting spokes 32. Hub portion 28 has a supplemental inflatable restraint system receiving area (SIR receiving area) 36 which serves as a receptacle for a supplemental inflatable restraint system (SIR system) 40. SIR system 40 is enclosed within SIR receiving area 36 by a cover member 45 that is contiguously formed as part of hub portion 28.

SIR system 40 includes a generally planar base unit 48 having a centrally located inflator aperture 52. Base unit 48 is generally quadrangular in shape in the embodiment being described. Thus, base unit 48 has a generally quadrangular configuration with a single central axis of symmetry across the diagonal which bisects the two opposing connecting spokes 32 of steering wheel assembly 20. As shown in FIG. 1A, base unit 48 generally complements the shape of SIR receiving area 36.

An air bag 56 is attached to base unit 48 and an inflator 60 associated with inflator aperture 52 in a conventional manner. The exact fold configuration of air bag 56 as it resides within SIR receiving area 36 will be described later with reference to FIGS. 3–15. The generally planar inflator 60 generally comprises the same shape as inflator aperture 52 and is situated adjacent base unit 48 opposite air bag 56 such that inflator 60 is in fluid communication with the interior of air bag 56. Inflator 60 is mounted to base unit 48 in a conventional manner and situated to direct an inflating fluid, such as nitrogen gas, into air bag 56 to thereby inflate air bag 56.

Referring specifically to FIG. 1B, lines of weakness 46 are formed on the underside of cover member 45 to provide areas of weakness that will yield to open cover member 45 when inflator 60 is activated. As such, air bag 56 will penetrate through cover member 45 during deployment to inflate and absorb the force exerted by a forward traveling vehicle occupant.

As shown in FIG. 1A, air bag 56, when folded in accordance with the present invention, generally complements the quadrangular shape of SIR receiving area 36. As such, two generally acute equivalent triangles are formed on either side of the diagonal line which forms the line of symmetry for SIR receiving area 36. Folding air bag 56 as such efficiently utilizes the space within SIR receiving area 36.

Figure 3A:
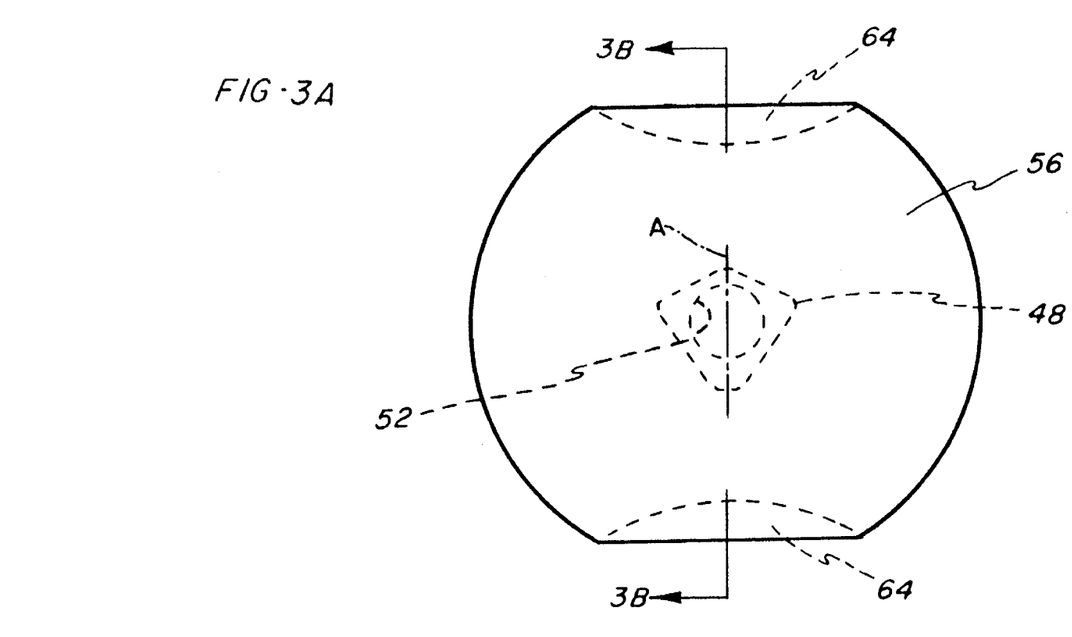
FIG. 3A is a top plan view of the first step in folding the air bag in accordance with the present invention, wherein a pair of first pleat folds extend inwardly from opposite lateral edges of the air bag.
Figure 3B:
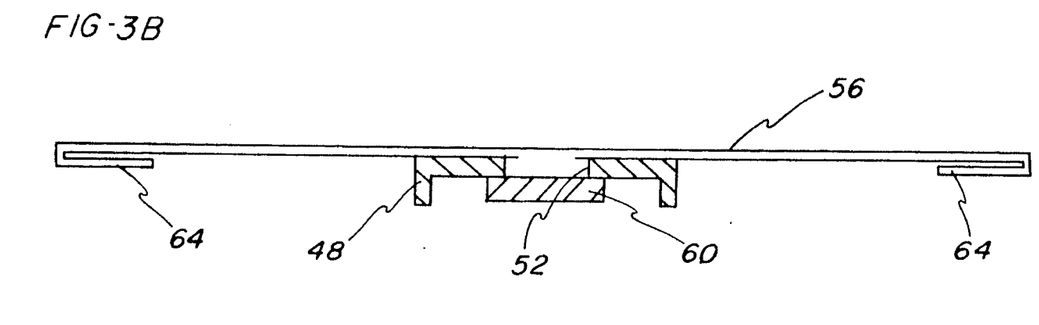
FIG. 3B is an expanded cross-sectional view taken along line 3B—3B in FIG. 3A.

Referring now to FIGS. 3A and 3B, shown is the first step in folding air bag 56 in accordance with the present invention. A pair of first pleat folds 64 are folded under air bag 56 from opposing lateral edges thereof toward base unit 48. The lateral edge of each first pleat fold 64 is perpendicular to, and bisected by, the axis of symmetry of base unit 48, as depicted by line A. Each first pleat fold 64, and the subsequent pleat folds of the present invention hereafter disclosed with reference to FIGS. 4A–6B, have a longitudinal width of approximately 1/12 the diameter of air bag 56. In the embodiment being described, the longitudinal width of each first pleat fold is approximately 2 inches.

Figure 4A:
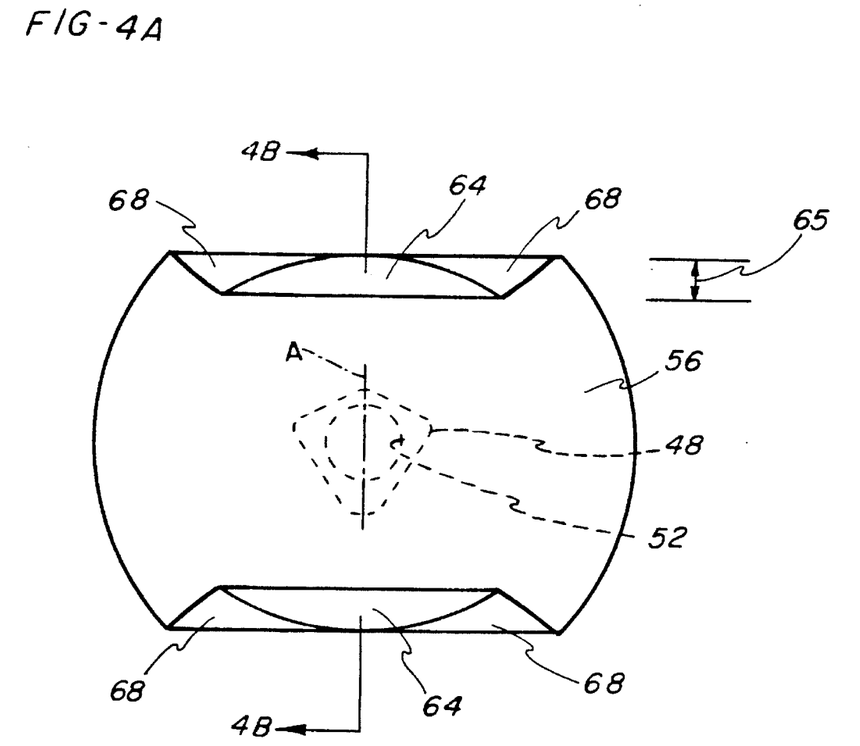
FIG. 4A is a top plan view of the second step in folding the air bag in accordance with the present invention, wherein the air bag is folded to have a pair of second pleat folds extending inwardly from opposite lateral edges of the air bag.
Figure 4B:
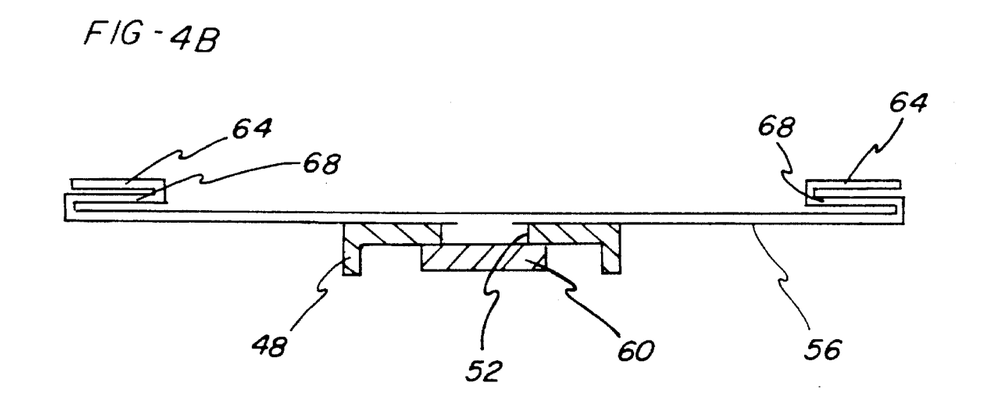
FIG. 4B is an expanded cross-sectional view taken along line 4B—4B in FIG. 4A.

Referring now to FIGS. 4A and 4B, shown is the second step in folding air bag 56 in accordance with the present invention. A pair of second pleat folds 68 are formed by folding the parallel lateral edges of first pleat folds 64 inward toward base unit 48. As shown in FIG. 4B, second pleat folds 68 have approximately the same longitudinal width, as defined by double arrows 65 in FIG. 4A, as first pleat folds 64. Second pleat folds 68, however, are folded in the opposite direction as were first pleat folds 64 relative to the surface of air bag 56. The lateral edge of each second pleat fold 68 is bisected by, and perpendicular to, the axis of symmetry A of base unit 48.

Figure 5A:
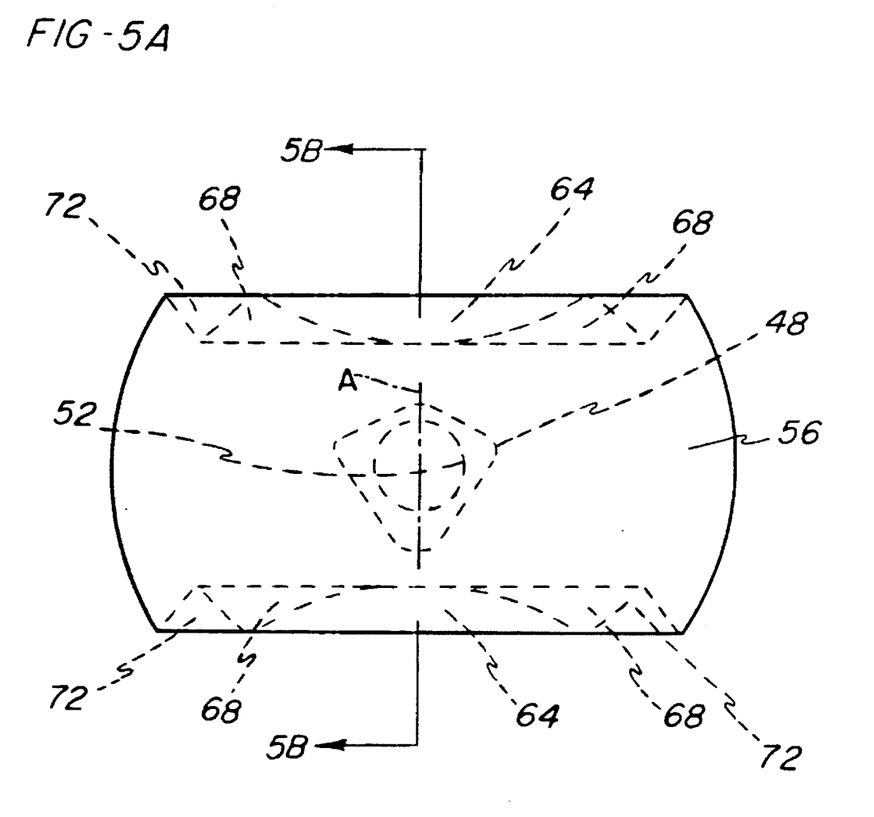
FIG. 5A is a top plan view of the third step in folding the air bag in accordance with the present invention, wherein the air bag has a pair of third pleat folds extending inwardly from opposite lateral edges of the air bag.
Figure 5B:
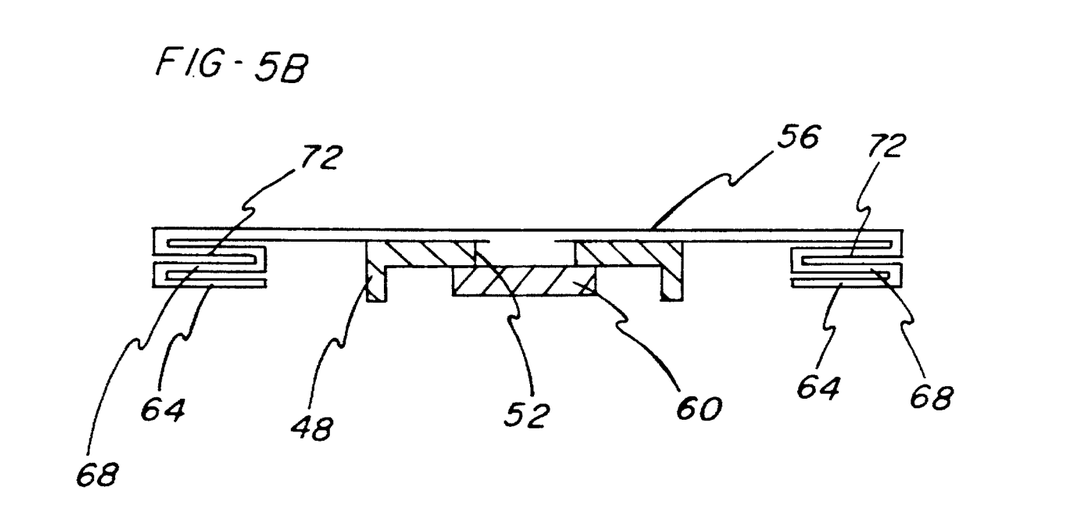
FIG. 5B is an expanded cross-sectional view taken along line 5B—5B in FIG. 5A.

Referring now to FIGS. 5A and 5B, shown is the third step in folding air bag 56 in accordance with the present invention. A pair of third pleat folds 72 are formed by folding the lateral edge of each second pleat fold 68 inward toward base unit 48. Third pleat folds 72 are folded under air bag 56, in the same direction that first pleat folds 64 were folded in relation to the surface of air bag 56.

The longitudinal width of third pleat folds 72 is approximately 2 inches, or generally the same longitudinal width as the stacked combination of first pleat folds 64 and second pleat folds 68. Third pleat folds 72 are bisected by, and perpendicular to, the axis of symmetry A of base unit 48.

Figure 6A:
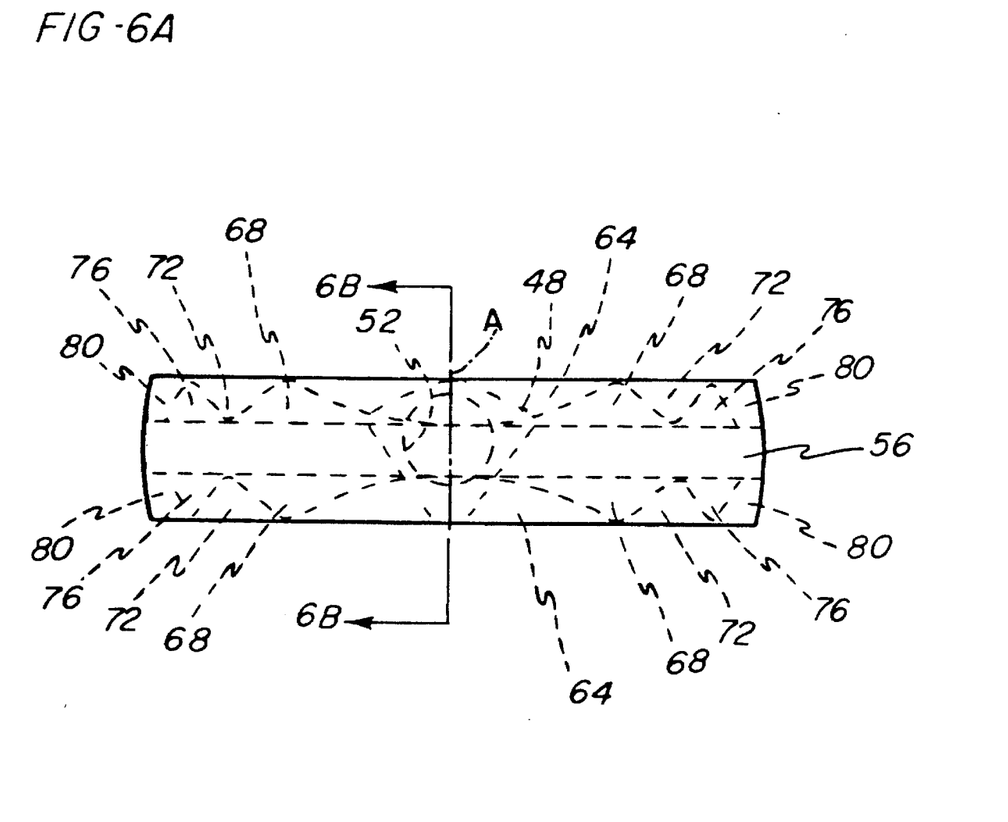
FIG. 6A is a top plan view of the fourth step in folding the air bag in accordance with the present invention, wherein the air bag has a pair of fourth and fifth pleat folds extending inwardly from opposite lateral edges of the air bag.
Figure 6B:
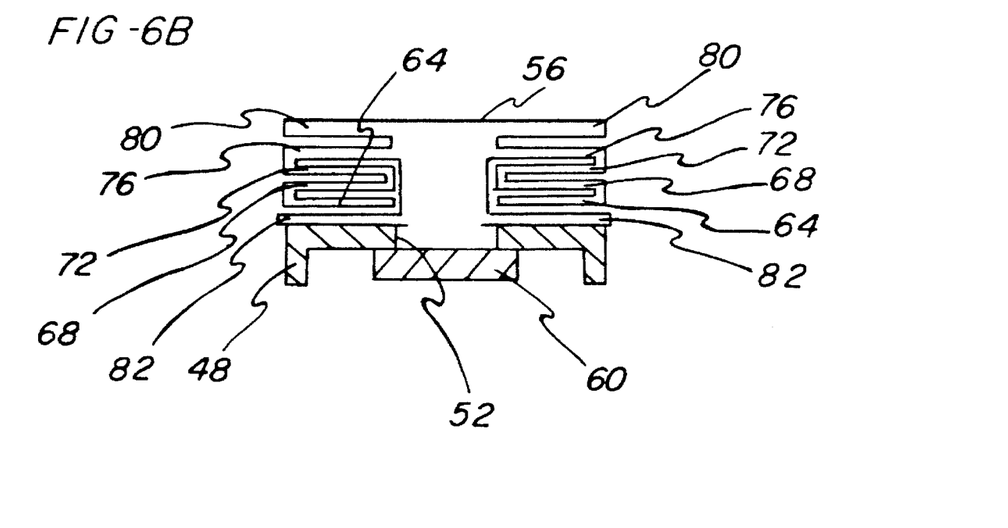
FIG. 6B is a cross-sectional view taken along line 6B—6B in FIG. 6A.

Referring now to FIGS. 6A and 6B, the stacked combination of first, second, and third pleat folds 64, 68, 72 is drawn inward toward inflator aperture 52 such that a pair of fourth pleat folds 76 and a pair of fifth pleat folds 80 are formed above the aforementioned stacked combination. This inward folding also creates a pair of sixth pleat folds 82 positioned between base unit 48 and the stacked combination of first, second, and third pleat folds, 64, 68, 72. Sixth pleat folds 82 have an approximate width of 2 inches, or generally the same longitudinal width as fifth pleat folds 80. As such, sixth pleat folds cannot be seen in FIG. 6A.

As shown in FIG. 6B, fourth, fifth, and sixth pleat folds, 76, 80, 82 have generally the same longitudinal width as first, second, and third pleat folds 64, 68, and 72. The stacked combination of first, second, third, fourth, fifth, and sixth pleat folds 64, 68, 72, 76, 80, 82 has a combined longitudinal width generally equal to the length of the diagonal line which provides the line of symmetry A for base unit 48, shown in FIG. 6A.

Referring now to FIGS. 7 through 15, shown is the fold progression of pleat stack 84 in accordance with the present invention. Pleat stack 84 comprises the stacked combination of first, second, third, fourth, fifth, and sixth pleat folds 64, 68, 72, 76, 80, 82 as shown in FIG. 6B.

Figure 7:
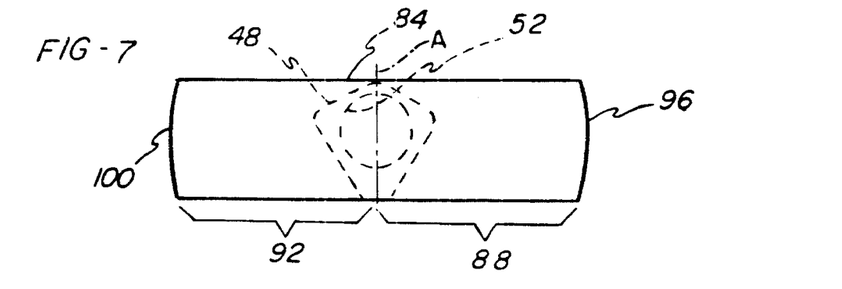
FIGS. 7–15 illustrate the reverse-flag triangular fold progression of an air bag in accordance with the present invention which provides the air bag in a shape that generally complements the shape of the SIR receiving area.

Referring now to FIG. 7, pleat stack 84 is bisected by the axis of symmetry A of base unit 48 to define a first pleat stack arm 88 and a second pleat stack arm 92. Pleat stack 84 is bounded on either end by a first end portion 96 and a second end portion 100, both of which have an arcuate peripheral profile. First and second pleat stack arms, 88, 92 are triangularly folded in accordance with FIGS. 8–15 to end in the fully folded generally quadrangular shape as depicted in FIG. 15. As is shown in FIGS. 8–15, first and second pleat stack arms 88, 92 are folded outwardly from a base unit 48 toward first end portion 96 and second end portion 100, respectively.

Figure 8:
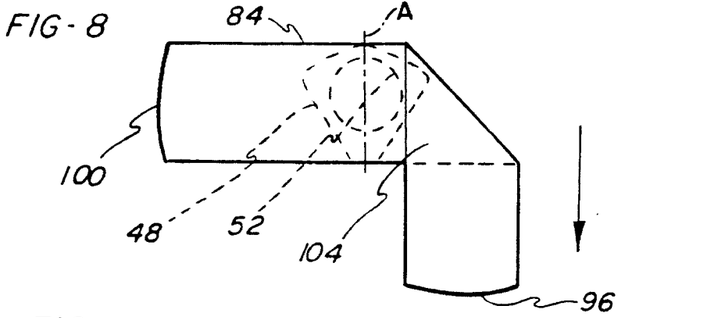

Referring specifically to FIG. 8, shown is the first step in reverse-flag triangularly folding pleat stack 84 in accordance with the present invention. First pleat stack arm 88 is folded perpendicular to the parallel lateral edges of pleat stack 84 to provide a first reverse-flag triangular fold pleat 104. First reverse-flag triangular fold pleat 104 is parallel to the axis of symmetry A of base unit 48 and lies directly superior to pleat stack 84. The medial edge of first reverse-flag triangular fold pleat 104 is positioned laterally from the axis of symmetry A of base unit 48 at the approximate point where inflator aperture 52 extends through base unit 48.

Figure 9:
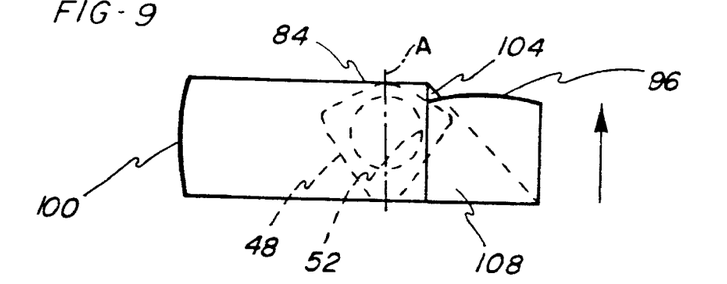

Referring now to FIG. 9, shown is the second step in reverse-flag triangularly folding pleat stack 84 in accordance with the present invention. First pleat stack arm 88 is doubled back onto itself to provide a second reverse-flag triangular fold pleat 108 such that second reverse-flag triangular fold pleat 108 is parallel to, and directly superior to, first reverse-flag triangular fold pleat 104. The medial corner of first end portion 96 lies directly superior to the medial edge of first reverse-flag triangular fold pleat 104.

Figure 10:
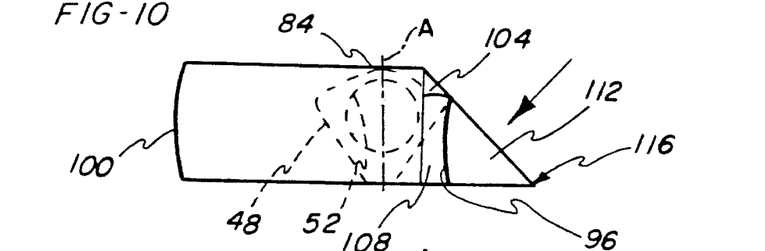

Referring now to FIG. 10, shown is the third step in reverse-flag triangularly folding pleat stack 84 in accordance with the present invention. A third reverse-flag triangular fold pleat 112 is formed by folding second reverse-flag triangular fold pleat 108 back onto itself toward the medial edges of first and second reverse-flag triangular fold pleats, 104, 108 to provide a first fold point 116 at the most lateral point of first pleat stack arm 88 as folded.

Figure 11:
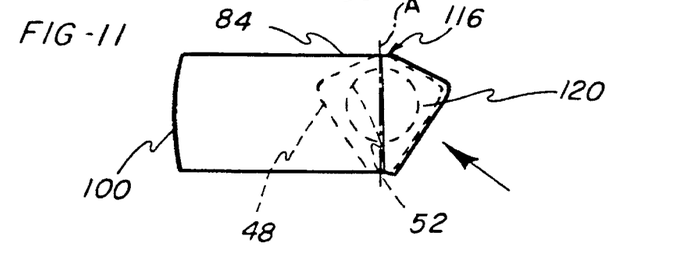

Referring now to FIG. 11, first pleat stack arm 88 is further folded to provide a fourth reverse-flag triangular fold pleat 120 that generally complements the shape of the underlying portion of base unit 48. To accomplish this, first fold point 116 of third reverse-flag triangular fold pleat 112 is folded inward toward the axis of symmetry A of base unit 48 such that first fold point 116 converges with the uppermost point along the axis of symmetry A of base unit 48. Folded as such, the uppermost point along the medial edge of fourth reverse-flag triangular fold pleat 120 converges with the axis of symmetry A of base unit 48. However, the other points along the medial edge of fourth reverse-flag triangular fold pleat 120 diverge laterally from the axis of symmetry A of base unit 48.

Figure 12:
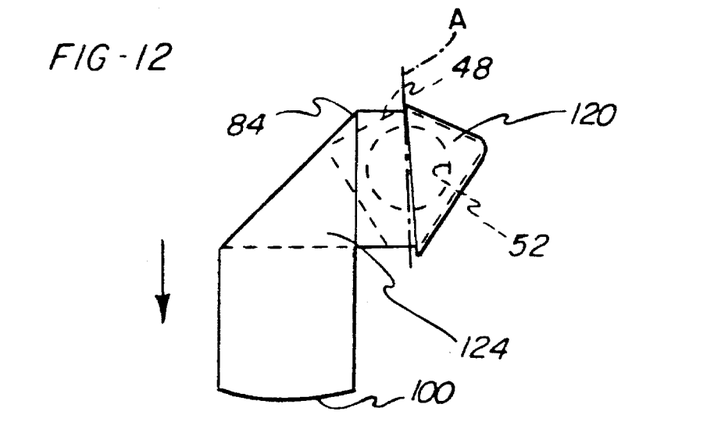

Referring now to FIG. 12, shown is the fifth step in reverse-flag triangularly folding pleat stack 84 in accordance with the present invention. Second pleat stack arm 92 is folded perpendicular to the parallel lateral edges of pleat stack 84 to provide a fifth reverse-flag triangular fold pleat 124. Fifth reverse-flag triangular fold pleat 124 is parallel to the axis of symmetry A of base unit 48 and lies directly superior to pleat stack 84. The medial edge of fifth reverse-flag triangular fold pleat 124 is positioned laterally from the axis of symmetry A of base unit 48 at the approximate point where inflator aperture 52 extends through base unit 48.

Figure 13:
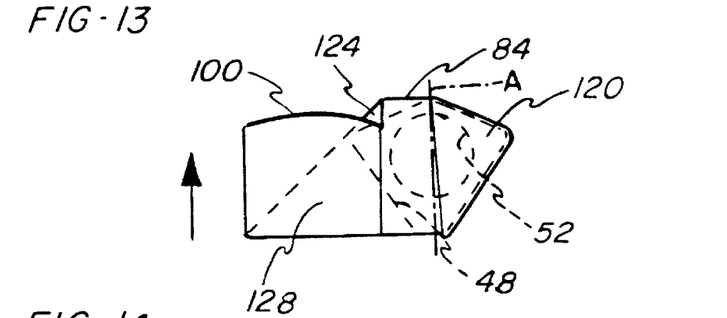

Referring now to FIG. 13, shown is the sixth step in reverse-flag triangularly folding pleat stack 84 in accordance with the present invention. Second pleat stack arm 92 is doubled back onto itself to provide a sixth reverse-flag triangular fold pleat 128 such that sixth reverse-flag triangular fold pleat 128 is parallel to, and directly superior to, fifth reverse-flag triangular fold pleat 124. The medial corner of second end portion 100 lies directly superior to the medial edge of fifth reverse-flag triangular fold pleat 124.

Figure 14:
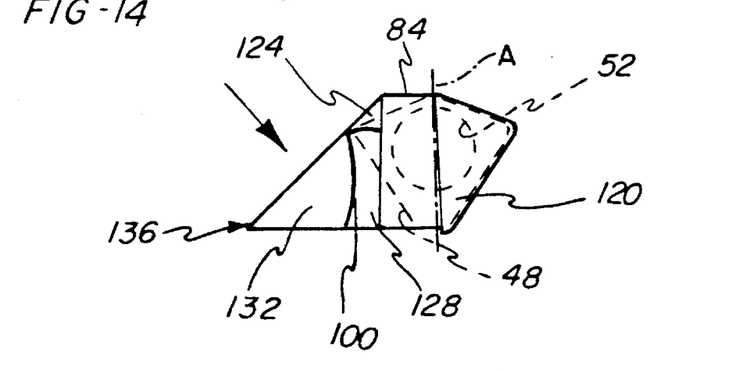
Figure 15:
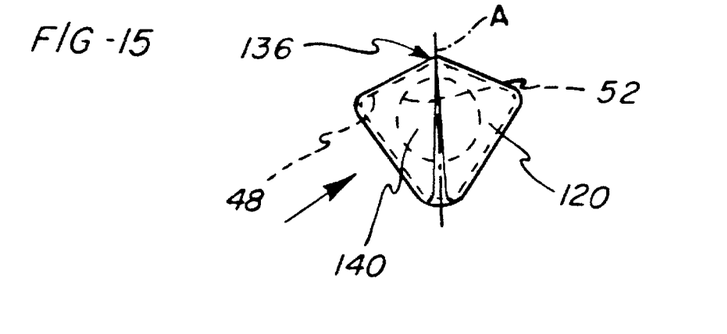

Referring now to FIG. 14, shown is the seventh step in reverse-flag triangular folding pleat stack 84 in accordance with the present invention. A seventh reverse-flag triangular fold pleat 132 is formed by folding sixth reverse-flag triangular fold pleat 128 back onto itself toward the medial edges of fifth and sixth reverse-flag triangular fold pleats, 124, 128, to provide a second fold point 136 at the most lateral point of second pleat stack arm 92 as needed.

Referring now to FIG. 15, second pleat stack arm 92 is further folded to provide an eighth reverse-flag triangular fold pleat 140 that generally complements the shape of the underlying portion of base unit 48. To accomplish this, second fold point 136 of seventh reverse-flag triangular fold pleat 132 is folded inward toward the axis of symmetry A of base unit 48 such that second fold point 136 converges with the uppermost point along the axis of symmetry A of base unit 48. Folded as such, the uppermost point along the medial edge of eighth reverse-flag triangular fold pleat 140 converges with the axis of symmetry A of base unit 48. However, the other points along the medial edge of eighth reverse-flag triangular fold pleat 140 diverge laterally from the axis of symmetry A of base unit 48.

It should be noted that, as an alternative, the fold progression as described with reference to FIGS. 7–15 can be reversed to produce the same final air bag fold as is illustrated in FIG. 15.

Taken together, eighth reverse-flag triangular fold pleat 140 and fourth reverse-flag triangular fold pleat 120 generally complement the shape of base unit 48.

Additionally, by creating a more compact air bag which better complements the shape of the base unit and SIR receiving area, the size of the SIR receiving area may be decreased. Such a decrease in size may also be advantageous in reducing costs associated with manufacturing such an SIR system. The SIR system may also be more aesthetically pleasing by having a lower profile with respect to the steering wheel assembly as enabled by the reduction in SIR system size.

While the forms of the device herein described constitute the preferred embodiments of the invention, it is to be understood that the invention is not limited to these precise forms of the device.

Figure 2A:
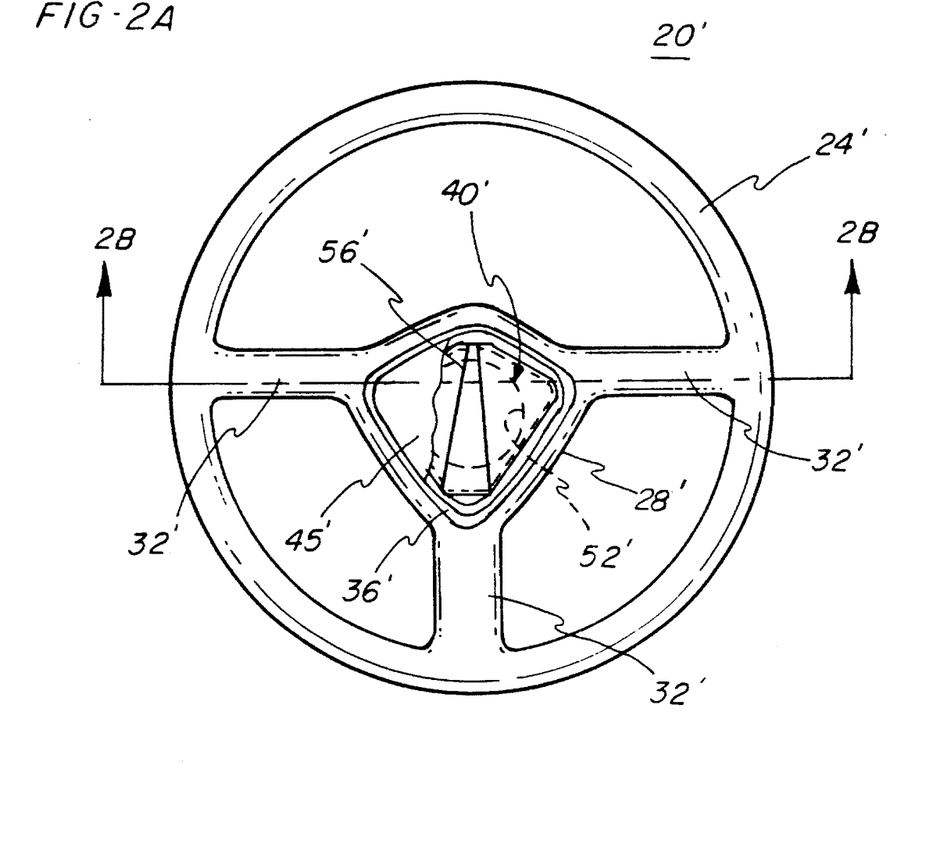
FIG. 2A is a partially cut away top plan view of a steering wheel assembly which employs a second embodiment of a supplemental inflatable restraint system of the present invention.
Figure 2B:
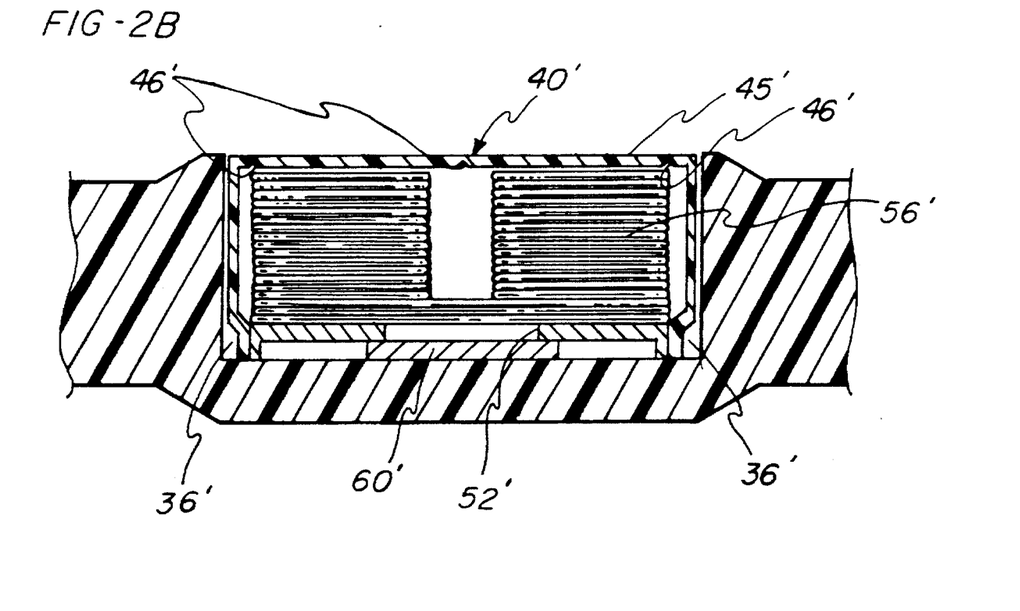
FIG. 2B is an enlarged cross-sectional view taken along line 2B—2B in FIG. 2A after an SIR system in accordance with a second embodiment of the present invention has been mounted to the steering wheel assembly.

For example, referring to FIGS. 2A and 2B, shown is another cover member 45' designed in accordance with the present invention, with corresponding parts being designated with a prime ('). In this embodiment, SIR system 40' includes cover member 45', air bag 56', base unit 48', and inflator 60'. Notice that cover member 45' is a shell-type casing having a generally quadrangular shape which is fixed to base unit 48' to enclose air bag 56'. Inflator 60' is positioned about inflator aperture 52' in fluid communication with the interior of air bag 56'. Cover member 45' is equipped with lines of weakness 46' formed on the underside of cover member 45' to allow cover member 45' to burst open in the event that an inflator 60' is activated.

Similar to the embodiment shown in FIGS. 1A and 1B, SIR system 40' generally complements the shape of SIR receiving area 36' such that the space within SIR receiving area 36' is utilized efficiently, minimizing the amount of empty space within SIR receiving area 36', when SIR system 40' is positioned in SIR receiving area 36'.

In addition, air bag 56' could be folded or rolled to have fewer or more folds than those described above, and the various steps may be performed in a different sequence.

Thus, changes may be made without departing from the scope of the invention which is defined in the appended claims.

What is claimed is:

1. A supplemental inflatable restraint system, comprising:
   a base having a quadrangular shape including a single axis of symmetry across a diagonal of the quadrangular shape;
   an air bag mounted to the base; and
   the air bag having a fold configuration which generally complements the shape of the base, the air bag including a pleat fold stack being a plurality of laterally extending folds, the pleat fold stack having opposing first and second pleat stack arms extending laterally from opposite sides of the axis of symmetry, each of the pleat stack arms including a series of continuous triangular folds to provide the air bag in a quadrangular shape matching the quadrangular shape of the base.

2. The supplemental inflatable restraint system of claim 1 wherein the quadrangular shape of the base includes four sides and wherein the folded air bag includes four outer edges contiguous with the four sides of the quadrangular shape of the base.

3. The supplemental inflatable restraint system of claim 1 wherein the pleat fold stack has a longitudinal width generally equal to a longitudinal width of the base.

4. The supplemental inflatable restraint system of claim 1 wherein the first and second pleat stack arms provide a pair of equivalent triangular fold stacks cooperatively forming the quadrangular shape of the base.

5. The supplemental inflatable restraint system of claim 1 wherein the quadrangular shape of the base includes unequal opposing sides and wherein the quadrangular shape of the base has equal adjacent sides across the axis of symmetry.

6. The supplemental inflatable restraint system of claim 1 wherein the pleat stack arms each have an initial triangular fold being a diagonal fold.

7. The supplemental inflatable restraint system of claim 1 wherein the pleat stack arms each have a final triangular fold being a diagonal fold towards the axis of symmetry.

8. A supplemental inflatable restraint system comprising:
  a base having a generally quadrangular shape including a single axis of symmetry across a diagonal of the quadrangular shape;
  an air bag mounted to the base; and
  the air bag having a fold configuration which complements the shape of the base, the air bag including a pleat fold stack being a plurality of laterally extending folds, the pleat fold stack having opposing first and second pleat stack arms extending laterally from opposite sides of the axis of symmetry, the first and second pleat stack arms each including a series of continuous triangular folds and each having a middle edge convergent with the axis of symmetry such that the air bag includes equivalent triangular fold stacks on opposing sides of the axis of symmetry, the triangular fold stacks cooperatively forming the quadrangular shape of the base.

9. The supplemental inflatable restraint system of claim 8 wherein the quadrangular shape of the base includes four sides and wherein the triangular fold stacks each have two edges contiguous with respective sides of the quadrangular shape of the base.

10. A method of folding an air bag into a quadrangular shape to complement a quadrangular shaped base portion having a single axis of symmetry across a diagonal of the quadrangular shape, the method of folding the air bag comprising the following steps of:
  laterally folding opposite sides of the air bag inward toward a center portion of the air bag to provide a pleat fold stack having a longitudinal width generally equal to a longitudinal width of the base portion such that the pleat fold stack includes opposing first and second pleat stack arms each extending laterally from opposite sides of the axis of symmetry; and
  providing each of the pleat stack arms with a series of continuous triangular folds to form a pair of equivalent triangular fold stacks, the triangular fold stacks each having a middle edge convergent with the axis of symmetry and each of the triangular fold stacks having two outer edges contiguous with a perimeter of the quadrangular shape of the base portion.

* * * * *